Patented May 4, 1943

2,318,284

UNITED STATES PATENT OFFICE 2,318,284

DRILLING MUD

Robert B. Booth, Springdale, Conn., assignor to American Cyanamid Company, New York, N. Y., a corporation of Maine No Drawing. Application March 27, 1941, Serial No. 385,470

6 Claims. (Cl. 252—8.5)

This invention relates to an improvement in the art of drilling wells and is concerned particularly with improving the properties of drilling fluids by controlling their viscosity and improving their wall-building and water-loss characteristics.

In drilling oil and gas wells by the rotary drilling process it is common practice to circulate a mud-laden fluid downwardly through the drill stem of the drill bit and upwardly through the drill hole. The circulating drilling mud serves to cool and lubricate the bit, mix with the cuttings and carry them to the surface, to seal off the sides of the well, to prevent loss of water from the drilling fluid into adjacent strata and other purposes. The mud issuing from the well is passed through a settling tank or ditch, or over a screen, whereby the drill cuttings are separated. The mud, substantially free from cuttings, is again circulated through the system.

A satisfactory drilling mud must posses certain definite viscosity characteristics. It must be of sufficiently high viscosity to carry the drill cuttings to the surface and at the same time be fluid enough to be pumped and to allow the cuttings to be separated from the mud. The mud should also be of such character that should circulating be stopped temporarily the cuttings will not settle out and prevent resumption of circulation or cause the drill bit to stick. Muds having thixotropic properties are employed to satisfy these requirements. Thixotropic muds contain large amounts of colloidal material in the form of hydrated clay particles. In some few cases the formation through which the well is being drilled will provide clay of sufficiently colloidal character to make up the drilling fluid. Ordinarily, however, it is necessary to add to the drilling fluid clays containing the proper amount of colloidal material. These clays may contain bentonite or a similar hydratable colloidal material which builds up the mud to the desired viscosity and thixotropic character. Soaps, boiled starch, gelatin and similar colloidal materials have also been employed for this purpose.

Another important characteristic of drilling mud is its wall-building properties. A good drilling mud must form on the walls of the well a thin, closely knit, impervious filter cake wall which prevents loss of water from the drilling fluid to the adjacent strata. Loss of water from the drilling fluid through this wall may result in serious consequences. Absorption of water in oil sands forces away the oil and blocks it off, sometimes permanently, from flowing into the well when it is put into production. Water from the drilling fluid may also dissolve cementing materials and cause caving, or in shale formations it may cause hydration and swelling of the shale with resulting heaving. The mud also tends to seal off water and gas sands, and in certain cases to temporarily block off minor oil sands.

While it is comparatively easy to prepare a drilling fluid of suitable viscosity and thixotropic properties it is exceedingly difficult to maintain their properties in the mud. The colloidally dispersed clay particles are easily flocculated when the mud is contaminated with salt or lime which results in a very great increase in viscosity, sometimes to the extent of excessive gel formation. Continued heating of the mud, as occurs when the mud is circulated through deep wells, also tends to effect the colloidal character of the clay and increase the viscosity of the drilling fluid. The flocculated mud in addition to being difficult to handle also has very poor wall-building properties, forming porous walls through which water is easily lost into the surrounding formations.

I have found that the viscosity of drilling fluids may be controlled and the wall-building and water-loss characteristics improved by the addition thereto of water-dispersible dyes. Of the various dyes tested nigrosine has proven to be most effective and because of its low cost and availability is the preferred material of the present invention.

The exact chemical structure of nigrosine is not definitely known but it is a dye of the azine type, Colour Index No. 865, prepared by reacting aniline, aniline hydrochloride and nitrophenol and sulfonating the product. Other methods of preparation are known and the structure of the compound probably varies accordingly. In addition to nigrosine I have used water-dispersible mono-azo dyes such as methyl orange, Colour Index No. 142, and lake red C, Colour Index No. 165. I have also used dyes of the class of triphenyl methanes, such as malachite green, Colour Index No. 657, and dark brown S, a solubilized earth coloring matter similar to sap brown, believed to be a humic acid complex. All of these dyes show thinning effects when added to drilling muds.

Although nigrosine when used alone is very effective to control viscosity of drilling muds and to improve their wall-building and water-loss characteristics as will be evident from the data disclosed in the specific examples which follow, its effectiveness is most apparent when used in conjunction with other viscosity controlling and wall-building compounds. Nigrosine is particularly useful to control viscosity of drilling muds treated with water-soluble polyphosphates. Sodium tetraphosphate, tetrasodium pyrophosphate, sodium acid pyrophosphate, sodium hexametaphosphate and other water-soluble polyphosphates are very effective in obtaining an initial reduction in the viscosity of flocculated mud. However, upon continued addition of many of these phosphates the viscosity of drilling fluids rises to a point that is in many cases higher than its original value, and further overtreatment may render the mud useless for the purpose intended. As shown in Tables I, II and III the addition of both nigrosine and phosphate to drilling fluids will not only cause the fluid to be greatly reduced in viscosity but also permits very large amounts of the treating material to be added to the mud without increasing the viscosity above usable values. This is important, since by using nigrosine it is possible to treat the mud with considerably more phosphate than is otherwise permissible, thereby prolonging the effective life of the mud.

Nigrosine may also be effectively used with other viscosity controlling materials such as waste sulfite liquor, alkali metal silicates, tannic acid extracts, etc.; urea, thiourea and urea derivatives as claimed in my copending application Serial No. 365,942, filed November 16, 1940, and dicyandiamide as claimed in my copending application Serial No. 366,380, filed November 20, 1940. In addition to acting together with these compounds to improve the viscosity and wall-building characteristics of the mud thus treated nigrosine serves to prolong the effective life of the mud and to offset the effect of decomposition of the mud itself or of organic reagents contained therein which may occur upon prolonged heating at high temperatures. This effect of nigrosine is clearly shown in Example 5.

Nigrosine may also be used in conjunction with gelatinous wall-building materials to further improve the wall-building and water-loss characteristics of the treated mud. Gum arabic, gum karaya and gum ghatti as claimed in my copending application Serial No. 382,172, filed March 7, 1941, alginates, crude pectate pulp and the like may be mentioned as examples of wall-building materials with which nigrosine is effective. Example 6 demonstrates the use of nigrosine with sodium alginate in improving the wall-building properties of drilling fluids.

The following examples are given by way of illustration to show the improvement in drilling muds by treatment with nigrosine and the advantages obtained by using nigrosine with other viscosity-controlling and wall-building and water-loss improving agents available in the art. These examples are, however, not to be construed as in limitation of my invention.

EXAMPLE 1

A drilling mud of a specific gravity of 1.31 was prepared by mixing 4 parts by weight of Ville Platte clay and 1 part by weight of a bentonitic clay and water and allowing the mixture to hydrate by standing. The Villa Platte clay was a Louisiana clay relatively low in colloidal matter whereas the bentonitic clay used was a highly colloidal clay representative of the kind found in shale formations that give viscosity troubles in drilling operations. This mixture approached very closely a type of drilling fluid actually employed in drilling. To various samples of the drilling mud was added varying amounts of nigrosine, tetrasodium pyrophosphate (T. S. P. P.), sodium acid pyrophosphate (S. A. P. P.), and 50% mixtures of nigrosine with sodium acid pyrophosphate and tetrasodium pyrophosphate. The Marsh funnel viscosity of the various mixtures was then determined with the following results:

TABLE I

Hydrated mixture Ville Platte clay and bentonitic clay

| Lbs./bbl. reagent | Marsh funnel viscosity | | | | |
|---|---|---|---|---|---|
| | TSPP | 50% nigrosine 50% TSPP | SAPP | 50% nigrosine, 50% SAPP | Nigrosine |
| | Seconds | Seconds | Seconds | Seconds | Seconds |
| None | 68+ | 60.0 | 67+ | 67+ | 66+ |
| 0.2 | 28.5 | 30.4 | 26.0 | 28.7 | 39.2 |
| 0.4 | 29.0 | 28.4 | 26.2 | 24.5 | 31.5 |
| 0.8 | 38.2 | 26.9 | | 24.5 | 27.0 |
| 1.3 | 46.0 | 26.6 | 26.5 | 24.8 | 25.5 |
| 1.8 | 62.2 | 26.2 | 28.0 | 24.8 | 25.3 |
| 2.3 | 93.0 | 25.7 | 29.4 | 25.0 | 24.8 |
| 3.3 | | 26.2 | 30.3 | 25.0 | 24.8 |
| 5.8 | | 26.2 | 34.0 | 25.5 | 26.0 |
| 10.8 | | 28.6 | 38.5 | 26.5 | 27.0 |
| 18.3 | | 68.0 | 42.5 | 30.2 | 30.2 |
| 28.3 | | | 51.0 | 32.5 | 39.0 |
| 38.3 | | | 87.0 | 37.0 | 60.5 |
| 43.3 | | | | 40.5 | 87.0 |

It is noted that the addition of small amounts of nigrosine reduces considerably the viscosity of the hydrated mud mixture and the addition may be continued over a wide range without increasing unduly the viscosity of the mud. The addition of sodium acid pyrophosphate decreases the mud viscosity almost as well as nigrosine but excessive amounts tend to thicken the mud. A 50-50 mixture of nigrosine and sodium acid pyrophosphate is seen to be more effective as a viscosity controlling agent than either nigrosine or sodium acid pyrophosphate. Tetrasodium pyrophosphate appears to be very critical in its effect, and the addition of slightly excessive amounts raised the viscosity of this mud to a very high figure. When added to the mud with an equal proportion of nigrosine it is observed, however, that large quantities may be added without danger of thickening.

EXAMPLE 2

A hydrated mud dispersion having a specific gravity of 1.11 was prepared from the bentonitic clay described in Example 1. This mud was treated with nigrosine, sodium tetraphosphate, tetrasodium pyrophosphate, and mixtures thereof and the viscosity determined as before.

TABLE II

Hydrated bentonitic clay; sp. grav. 1.11

| Lbs./bbl. reagent | Marsh funnel viscosity | | | |
|---|---|---|---|---|
| | STP | TSPP | 40% nigrosine, 60% TSPP | Nigrosine |
| | Seconds | Seconds | Seconds | Seconds |
| None | 60+ | 60+ | 60+ | 60+ |
| 0.2 | 27.2 | 29.3 | 28.4 | 37.1 |
| 0.4 | 27.3 | 31.5 | 28.3 | 31.1 |
| 0.8 | 29.9 | 51.1 | 32.2 | 27.3 |
| 1.3 | 38.9 | 92.0 | 35.8 | 25.9 |
| 1.8 | 58.8 | 225.0 | 41.0 | 25.8 |
| 2.3 | 91.3 | | 50.5 | 25.5 |
| 3.3 | | | 85.0 | 25.0 |
| 5.8 | | | | 25.5 |
| 8.3 | | | | 26.7 |
| 13.3 | | | | 27.7 |
| 18.3 | | | | 28.7 |
| 23.3 | | | | 32.0 |
| 33.3 | | | | 40.0 |
| 43.3 | | | | 65.0 |

This mud dispersion was very sensitive to the addition of sodium tetraphosphate and tetrasodium pyrophosphate and the viscosity was increased greatly by the addition of slightly more than the critical amount of phosphatic reagent. On the other hand nigrosine more effectively reduced the mud viscosity and could be added over a wide range of concentrations.

EXAMPLE 3

A drilling mud having a specific gravity of 1.35 was prepared by mixing McKittrick clay, a California clay widely used for preparing drilling fluids used in oil and gas well drilling operations, with water and allowing the clay to hydrate by standing for several weeks. 1% by weight of NaCl was thoroughly mixed into the clay suspension and the mud divided into three portions. To one portion of the mud was added 1% by weight of nigrosine and to a second portion was added 5% by weight of nigrosine. The sample containing no nigrosine and the sample containing 1% of nigrosine were thin gels. The strength of these gels was measured by means of a standard shearometer and the results indicated in the table below as pounds per 100 sq. ft. The first value cited is the initial gel strength and the second value is the 10 minute gel strength. To each of the three samples of mud was added sodium tetraphosphate (STP) in small amounts and the gel strength and viscosity again determined. The results are shown in the following table.

TABLE III

1% NaCl

Gel strength lbs./100 sq. ft.

| Lbs./bbl. STP | Marsh funnel viscosity | | |
|---|---|---|---|
| | Blank | 1% nigrosine | 5% nigrosine |
| | Seconds | Seconds | Seconds |
| None | 62#–90# gel | 45#–60# gel | 47.4 |
| 0.15 | 43#–70# gel | 25#–38# gel | 41.0 |
| 0.30 | 47.0 sec. | 43.2 sec. | 34.5 |
| 0.50 | 35.0 | 33.3 | 32.5 |
| 1.0 | 30.2 | 28.8 | 28.8 |

The results of this series of tests indicate the effectiveness of nigrosine in reducing gelling tendencies in salt-cut muds and further shows the effectiveness with which nigrosine may be employed with phosphatic viscosity reducing agents.

EXAMPLE 4

A drilling mud having a specific gravity of 1.35 was prepared from McKittrick clay and its Marsh funnel viscosity determined. A sample of this mud was then treated with 500 parts per million $Ca^{++}$ in the form of lime, $Ca(OH)_2$, agitated thoroughly and its viscosity again determined. The lime-cut mud was then treated with nigrosine, sodium tetraphosphate (STP) and mixtures thereof and the viscosity determined as before. The results are as follows:

TABLE IV

McKittrick mud—$Ca(OH)_2$ treated

| | Marsh funnel viscosity |
|---|---|
| | Seconds |
| Raw mud | 53.2 |
| Raw mud+500 ppm $Ca^{++}$ | 61.4 |
| Raw mud+500 ppm $Ca^{++}$+1% nigrosine | 50.7 |
| Raw mud+500 ppm $Ca^{++}$+0.15 lb./bbl. STP | 37.8 |
| Raw mud+500 ppm $Ca^{++}$+1% Nig.+0.15 lb./bbl. STP | 36.0 |
| Raw mud+500 ppm $Ca^{++}$+1% Nig.+0.5 lb./bbl. STP | 27.5 |

Although the addition of lime to the mud increased its viscosity, the addition of nigrosine decreased the viscosity to a value lower than that of the uncontaminated mud. These results also show nigrosine to be effective on lime-cut and cement-cut muds when used with phosphate treating agents.

EXAMPLE 5

As the temperature of drilling muds frequently becomes high because of heat absorbed during its passage through deep wells a series of tests was made to determine the stability of nigrosine treated drilling fluids. Three samples of drilling mud were heated at 96° C. for 46 hours in iron cylinders fitted with reflux condensers. To one sample was then added 10% by weight of dicyandiamide; to a second sample was added 10% of dicyandiamide plus 5% of nigrosine and the third sample served as a control. The heating of each sample was then continued for 118 hours more at 96–98° C. As a result of this drastic treatment the control sample containing no treating agent upon cooling set to a gel. The sample which had been treated with 10% dicyandiamide also set to a gel as a result of the prolonged heating. The sample containing 5% nigrosine and 10% dicyandiamide, however, could be readily poured through the Marsh viscosimeter and its viscosity determined. Addition of sodium tetraphosphate was then made to the various mud samples to determine the effects of this material on reducing the mud viscosity. Results are shown in the following table:

TABLE V

| Lbs./bbl. STP | Marsh funnel viscosity | | |
|---|---|---|---|
| | Control | 10% dicyandiamide | 5% nigrosine, 10% dicyandiamide |
| | Seconds | Seconds | Seconds |
| None | 28#–44# gel | 110#–140# gel | 128.0 |
| 0.5 | 40.3 | 19#–70# gel | 42.3 |
| 1.0 | 37.9 | 120.0 | 34.5 |
| 2.0 | 36.9 | 98.5 | 34.2 |
| 4.0 | 36.7 | 114.0 | 34.6 |
| 8.0 | 45.8 | | 35.8 |

These results clearly show that nigrosine is stable under prolonged heating and remains effective as a viscosity-reducing agent. The mud containing dicyandiamide and nigrosine could be treated with phosphates and reduced in viscosity to normal values even though subjected to treatments much more severe than would normally be encountered.

EXAMPLE 6

The improved wall-building properties of drilling muds treated with nigrosine was demonstrated in the following tests. A drilling fluid prepared from McKittrick clay was treated with 2% NaCl and 1 pound per barrel of sodium tetraphosphate and heated in an iron cylinder at 95° C. for 16 hours. The Marsh funnel viscosity was measured at room temperatures and the wall-building and water-loss characteristics of the mud determined at 66° C. by means of a standard wall-building tester. This instrument consists essentially of a cylinder of 3″ internal diameter, 5″ in depth and having a perforated bottom plate supporting a screen over which a #50 Whatman filter paper is placed. 500 ccs. of drilling mud are poured into the cylinder and a pressure of 100 pounds per sq. in. of nitrogen is applied to the mud over the filter paper. The water loss from the mud through the filter paper and filter cake deposited thereon is determined over a 60 minute period. A like test was made on the same mud but treated with 2 pounds of nigrosine per barrel of mud prior to the 16 hour heating period.

TABLE VI

2% NaCl; 1 lb./bbl. STP; 66° C.

| Lbs./bbl. nigrosine | Water loss cc. in 1 hour | Filter cake thickness | Marsh funnel viscosity |
|---|---|---|---|
| | | | Seconds |
| None | 25.0 | 9/32 | 30.0 |
| 2 | 22.4 | 9/32 | 26.0 |

EXAMPLE 7

The effectiveness of nigrosine when used in conjunction with other wall-building materials was shown in tests made with muds treated with sodium alginate, a well-known wall-building compound. A drilling mud having a specific gravity of 1.22 prepared from McKittrick clay and containing 1% NaCl and 1 pound per barrel of tetrasodium pyrophosphate was employed in these tests. The addition of relatively small amounts of nigrosine to the sodium alginate-treated mud further reduced the water loss through the filter cake without increasing the viscosity of the mud.

TABLE VII

NaCl 1%; TSPP 1 lb./bbl.; sp. g. 1.22

| Water loss reagent lbs./bbl. | Water loss cc. in 1 hour | Cake thickness | Viscosity |
|---|---|---|---|
| | | | Seconds |
| None | 24.0 | 3/32 | 25.2 |
| 0.25 Na alginate | 18.5 | 3/32 | 25.6 |
| 0.25 Na alginate +0.25 nigrosine | 17.0 | 3/32 | 25.6 |
| 0.25 Na alginate +1.0 nigrosine | 16.5 | 3/32 | 25.4 |
| None | 20.7 | 3/32 | 22.6 |
| 0.5 Na alginate | 15.2 | 3/32 | 28.0 |
| 0.5 Na alginate +1.0 nigrosine | 11.0 | 3/32 | 27.9 |

As indicated by the foregoing examples nigrosine may be used to improve straight drilling muds of various types including those contaminated with appreciable amounts of salt, lime, cement and other materials present in undesired amounts. In addition to the use of nigrosine alone my invention contemplates the use of this material with other viscosity-controlling reagents, wall-building and water-loss improvers, specific gravity increasing agents such as barytes, litharge, metal filings, etc., added colloidal matter such as bentonite, boiled starch, soaps, gelatin, etc. and fibrous materials such as beet pulp, cellulose fibers and the like.

The amount of nigrosine added to the drilling mud depends principally upon the characteristics of the particular mud being treated, its degree of contamination and content of other treating materials and upon the results desired. As indicated in the above examples, a fraction of a pound of nigrosine per barrel of mud is sufficient to reduce the viscosity of thick drilling fluids to a workable degree. On the other hand more than 30 pounds of nigrosine per barrel has been added to typical drilling fluids without seriously impairing its viscosity and wall-building properties.

Ordinarily the dye will be dispersed in water and added to the drilling fluid from time to time and in such quantities as are deemed sufficient for the results desired. It is possible, however, to add the powdered dyestuff directly to the mud or to the clay from which the mud is to be made. It may also be mixed with bentonite, barytes or other materials which are intended to be added to the mud. It is to be understood, of course, that the invention is not limited by any particular method of addition of nigrosine to the drilling fluid.

What I claim is:

1. A drilling mud for use in drilling oil and gas wells which comprises clay and nigrosine in amounts effective to control the viscosity of the mud.

2. A drilling mud for use in drilling oil and gas wells which comprises clay, nigrosine in amounts effective to control the viscosity of the mud, and another viscosity-reducing agent.

3. A drilling mud for use in drilling oil and gas wells which comprises clay, nigrosine in amounts effective to control the viscosity of the mud, and a water-soluble polyphosphate.

4. A drilling mud for use in drilling oil and gas wells which comprises clay, nigrosine in amounts effective to control the viscosity of the mud and a gelatinous wall-building material.

5. A drilling mud for use in drilling oil and gas wells which comprises clay, nigrosine in amounts effective to control the viscosity of the mud and a gum.

6. A drilling mud for use in drilling oil and gas wells which comprises clay, nigrosine in amounts effective to control the viscosity of the mud and an alginate.

ROBERT B. BOOTH.